Oct. 18, 1932.     M. SCHWARZE     1,882,993
PLUG CALIPERING DEVICE
Filed May 17, 1928
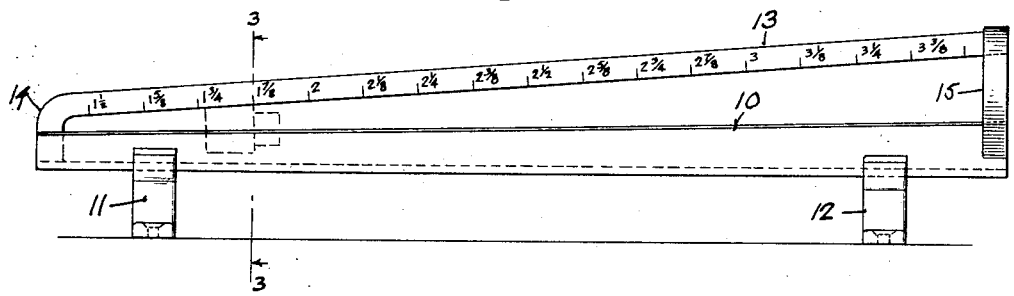
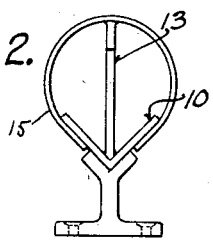
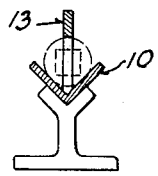
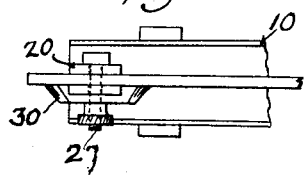
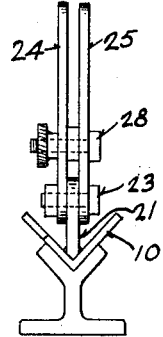
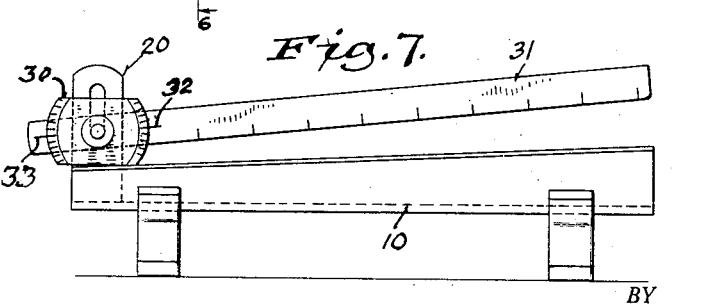
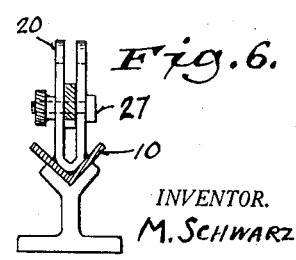
INVENTOR.
M. SCHWARZE,
BY
Erwin, Wheeler Haaland
ATTORNEYS.

Patented Oct. 18, 1932

1,882,993

UNITED STATES PATENT OFFICE

MAX SCHWARZE, OF MILWAUKEE, WISCONSIN

PLUG CALIPERING DEVICE

Application filed May 17, 1928. Serial No. 278,464.

The invention relates to devices of simple construction for checking the taper and determining the diameter of screw plugs, reamers, drill points, and other cylindrical articles in which the accurate ascertainment and determination of the dimensions of the article before use, is very desirable.

The invention resides in an elongated bed or base having a channel for supporting in accurate position the article, the dimensions of which are to be ascertained, and a scale bar suitably supported in relatively fixed position over the channel.

The invention also includes a graduated scale bar arranged longitudinally and at an angle with relation to the bed, with the two parts converging at one end of the device, so as to form between them a space of progressively diminishing width into which the article to be measured may be easily passed and moved longitudinally while resting in the channel of the bed, until such article engages the scale bar. In such position, the marks appearing on the scale bar at the point of engagement of the article therewith, will indicate the diameter of tapering articles, such as plugs and reamers, etc., and check or verify their taper as well as the diameter of drill points or other articles of uniform diameter.

The invention may be provided with means for adjusting the angle of the scale bar with relation to the bed, so as to readily adapt the device to the measurement of articles which have different tapers. But in a simple form in which the invention has been embodied, the adjusting means may be omitted, such means not being essential to the practical use of the invention under certain circumstances, as will hereinafter be pointed out.

These and other features residing in the invention will now be more fully described, and the novelty thereof pointed out in the appended claim.

In the accompanying drawing:—

Figure 1 shows in side elevation my invention in its simplest form, with the scale bar in fixed relation to the channeled bed member.

Fig. 2 is a view in end elevation, looking from the right of Fig. 1.

Fig. 3 is a transverse vertical sectional view on the line 3—3, Fig. 1, looking in the direction of the arrows.

Fig. 4 is a view in side elevation showing the scale bar as adjustable, with means at each end for holding the scale bar in adjusted position.

Fig. 5 is a view in end elevation, looking from the right in Fig. 4.

Fig. 6 is a transverse sectional view on the line 6—6, Fig. 4, looking in the direction of the arrows.

Fig. 7 is a view similar to Fig. 4, but showing means at one end only for adjusting the angle of the scale bar.

Fig. 8 is a plan view of the graduated member of the clamp shown in Fig. 7.

In the drawing, the numeral 10 indicates a bed or base member, and the numerals 11 and 12, the feet or supports therefor. The bed 10 is conveniently formed upon its upper side with a channel, the sides of which stand preferably at exactly 90° with relation to each other throughout their length. The manner of the attachment of the bed 10 to its feet 11 and 12, is not material, and may be effected in any desired manner. By reason of the fact that cylindrical articles placed in the channel for ascertainment of their diameters or other measurement, contact with the sides of the channel at two points 90° apart, in the circumference of the article, it is preferable that the sides of the channel be wider at one end than at the other, in order that articles of larger diameter may properly be supported by the wider sides of the channel at the points contemplated. But the width of the sides of the channel is optional, and may be varied. A graduated scale bar, extending at an angle lengthwise of the bed is arranged above the latter, and in a vertical plane co-incident with the bisecting plane of the angle at the bottom of the channel formed by the meeting of the sides thereof, so as to constitute the third point of contact, about the circumference of the article. The features described are common to all forms of the invention.

In Fig. 1, the graduated scale bar 13, is bent angularly at one end to provide a short, downwardly extending arm 14, the free end of which is permanently connected to the bed 10 at the end of the channel. From the end mentioned, the scale bar gradually diverges toward the other end of the bed, the diverging end of the scale bar being attached at the inside of a loop 15 of circular form, and produced by bending a stiff, metal strip. The ends of the loop are brought to the underside of the bed 10, and permanently attached thereto ( in such manner that the scale bar 13 is maintained in fixed position with relation to the bed 10. The construction shown in Fig. 1 is especially designed for calipering tapered plugs of selected taper, and in such use, there is no requirement that the position of the scale bar be changed, for it is initially arranged at an angle corresponding to the taper of such plugs.

Between the channel of the bed 10 and the scale bar 13, there is provided a space for the plugs, such space being defined by three points of contact, two of such points being located on the sides of the channel and the third on the under side of the scale bar. The scale bar 13 is graduated to correspond with plugs of different diameters.

A measuring device as above described is intended for permanent location near the storage bin for the stock of plugs of uniform taper but of different sizes, where it will be conveniently accessible. The workman desiring a plug of given size, can select the plug from stock, and verify its diameter by calipering it, and at the same time ascertain that it is correct as to taper before carrying it to the place of use. Plugs of small and medium diameters may be slipped laterally into the channel and moved therealong for ascertainment of their diameter and taper when the three point contact is established, reading of the graduated scale constituting the verification. Plugs, within the capacity of the device, but too large to be passed laterally into the channel, may be entered through the open loop at the end.

Fig. 4 shows a device in which the graduated scale bar is vertically adjustable so as to provide for a range exceeding that of the device with a fixed scale bar. An upstanding, split post 20 is attached to the bed at the converging end, in the line of the angle at the bottom of the channel, and an ear 21 is similarly attached at the other end of the bed. The post 20 is provided with a transverse vertical slot 22 and the ear 21 with a transverse perforation for the reception of a bolt 23 acting as a pivot. Links 24 and 25, through perforations at their lower end, are mounted so as to pivot on the bolt 23. The links 24 and 25 embrace the ear 21 between them, and are slotted for the greater part of their length. The slots register transversely when the links are aligned.

The scale bar 26 is perforated transversely at each end, and its support upon the post 20 is effected by a bolt 27, passing through the slot 22 and the perforation in the converging end of the bar. By means of a thumb or other nut on the bolt 27, the converging end of the scale bar 26, may be adjusted to any desired position of elevation. And by means of a like bolt 28, passing through the slots in the links 24 and 25 and the perforation in the adjacent end of the scale bar, the dividing end of the latter may be secured in any desired position of elevation, by means of a thumb or other nut on the bolt 28, so that the scale bar 26 may thus be adjusted to meet the requirement of different tapers, as well as to increase the range of calipering by the device. Inasmuch as the diverging end of the device is not provided with an open end for the insertion of articles of larger diameter, as in the construction shown in Fig. 1, a portion of the near side of the channel or the diverging end of the device, is cut away, as at 29, to permit such insertion.

Fig. 7 is a view illustrating a construction quite similar to that shown in Fig. 4, but omitting the adjusting and holding means at the diverging end of the scale bar, so that the device is provided with an open end into which articles such as drills may be passed for ascertainment of their gauge. The bed 10 and the post 20 mounted therein, are the same as in Fig. 4, but the scale bar 30 is provided with a perforation at the converging end only. In connection with the post 20 and the bolt 27, I employ a clamping member 30, adapted by means of a channel at its rear side to be guided upon the post 20, and to move thereover with the scale bar 31, the bolt 27, passed through a perforation in the clamping member, securing the clamping member and the scale bar in adjusted position upon the post. The opposite edges of the clamping member are suitably graduated and the scale bar is provided with indexes 32 and 33 adjacent the graduations of the scale of the clamping member. The scale bar is first positioned so as to permit a certain range of calipering, and is then carefully adjusted in accordance with the graduations on the clamping member. When the scale bar has been positioned exactly as desired, it is secured in such position by means of the bolt 27.

Having thus described my invention, what I claim and desire to secure by Letters Patent of the United States, is:

A calipering device comprising an elongated bed provided with a longitudinally extending V-channel the side walls of which constitute a 2-point contact and support for a cylindrical article while the diameter of the latter is being determined or its taper is being checked, and a scale bar positioned above the channel in a plane co-incident with the bisecting plane of the angle of the channel and forming the third point of contact for the said cylindrical article in the calipering operation, and means at each end of the bed for supporting the scale bar in the position described, the means at one end comprising an open loop through which the article may be passed axially to engage the points of contact.

In testimony whereof I have signed my name at Milwaukee, this 7th day of May, 1928.

MAX SCHWARZE.